United States Patent
English

[19]

[11] Patent Number: 5,879,088
[45] Date of Patent: Mar. 9, 1999

[54] COMPUTER KEYBOARD WITH ADJUSTABLE FORCE KEYSTROKE FEATURE USING AIR PRESSURE

[75] Inventor: George P. English, Coeur d'Alene, Id.

[73] Assignee: Key Tronic Corporation, Spokane, Wash.

[21] Appl. No.: 976,980

[22] Filed: Nov. 24, 1997

[51] Int. Cl.⁶ .............................. B41J 5/26; H01H 13/70
[52] U.S. Cl. ..................... 400/481; 200/5 A; 200/306; 400/472
[58] Field of Search ................. 400/481, 491.1, 400/479, 480, 179, 472; 200/5 A, 306

[56] References Cited

U.S. PATENT DOCUMENTS

| | | | |
|---|---|---|---|
| 3,805,939 | 4/1974 | Ross | 400/179 |
| 4,109,118 | 8/1978 | Kley | 200/5 E |
| 4,500,758 | 2/1985 | Guckenheimer | 200/5 A |
| 4,760,217 | 7/1988 | Suzuki et al. | 400/488 |
| 4,795,888 | 1/1989 | MacFarlane | 235/145 R |
| 5,219,067 | 6/1993 | Lima et al. | 200/5 A |
| 5,220,318 | 6/1993 | Staley | 340/825.34 |
| 5,466,901 | 11/1995 | Mochizuki | 200/5 A |
| 5,471,022 | 11/1995 | Kiss et al. | 200/306 |
| 5,595,449 | 1/1997 | Vitkin | 400/472 |
| 5,616,897 | 4/1997 | Weber et al. | 200/5 A |
| 5,666,112 | 9/1997 | Crowley et al. | 400/491.1 |
| 5,742,242 | 4/1998 | Sellers | 341/22 |

Primary Examiner—Edgar Burr
Assistant Examiner—Leslie Grohusky
Attorney, Agent, or Firm—Wells, St. John, Roberts, Gregory & Matkin P.S.

[57] ABSTRACT

A computer keyboard 10 having a plurality of keys 18 at desired locations being supported above a support plate 20 having a plurality of apertures 22 at the desired locations. A membrane keyswitch assembly 24 is mounted on the support plate 20 having keyswitches at each desired location. The keys have key plungers 28 that move up and down in the support plate apertures 22. An elastomeric dome sheet 46 is mounted over the membrane keyswitch assembly 24 with individual elastomeric dome return springs for biasing the keys 18 to their up position. An air chamber 52 is formed beneath the support plate 20 extending between the desired key locations. An air-impervious elastomeric membrane 60 is sandwiched between the air chamber 52 and the support plate 20 forming a flexible upper wall that receives and engages the key plungers 28. The membrane 60 has individual pedestal portions at the key locations for engaging the plungers 28. A manually adjustable air supply is connected to the air chamber 52 to adjust the air pressure and thereby adjust the force required to actuate a key.

12 Claims, 2 Drawing Sheets

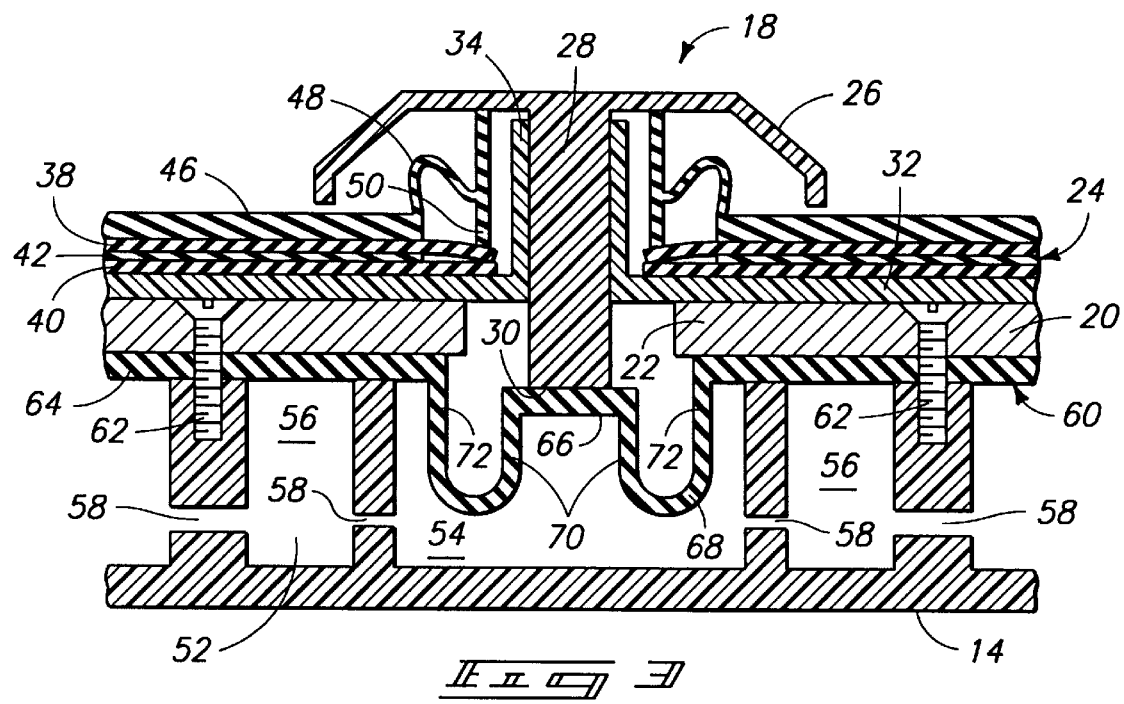

COMPUTER KEYBOARD WITH ADJUSTABLE FORCE KEYSTROKE FEATURE USING AIR PRESSURE

TECHNICAL FIELD

This invention relates to computer keyboards have adjustable force keystroke features particularly those using air pressure.

BACKGROUND OF THE INVENTION

Even though it has been generally recognized for a number of years that it would be desirable to provide a computer keyboard in which the keystroke force required to activate a keyswitch is adjustable, it has been found that to include such a feature substantially increases the cost of the keyboard and may reduce other performance characteristics of the keyboard, including its useful life.

For example, U.S. Pat. No. 5,466,901 granted to Isao Mochizuki on Nov. 14, 1995 is directed to an "adjustable touch computer keyboard" having scissor-like leg structures supporting keytops with compression coil springs used to assist in biasing the keytops to the "up" position. A slide mechanism is used to adjust the compression of the spring to vary the "touch" or "feel" of the key. Such a design is quite expensive.

Another example is described in U.S. Pat. No. 4,500,758, granted to Peter U. Guckenheimer on Feb. 19, 1985. Such patent is directed to a keyboard having a mechanical cam means to adjust the length of the keystroke to vary the "tactile feel" of the keys. U.S. Pat. No. 5,220,318 granted to Darrell S. Staley on Jun. 15, 1993 describes an adjustable "touch" control using magnetic key plungers located within adjustable magnetic fields to vary the forces required to depress the keys and activate the keyswitches.

U.S. Pat. No. 4,795,888 granted to Andrew R. MacFarlane on Jan. 3, 1989 describes a computer keyboard that has a variable force keystroke feature in which an apertured air pressure bladder is placed underneath the keytops so that as the keytops are depressed the outer edges of the keytops engage the upper layer of the bladder thereby increasing the force required to continue depressing the keytop until the keyswitch is actuated. The air pressure in the bladder may be adjusted to vary the keystroke force required to actuate the keyswitch. One of the major problems with such a design is that the spring action of the air pressure is not linear over the full stroke of the key but rather is more exponential in character, thereby not only changing the force required to depress the keytop but also dramatically changing the "tactile feel" (shifting the force-displacement curve laterally) at the various air pressure settings. Furthermore, the force required to depress a key will vary depending upon the size of the keytop. The larger keytops will require a larger force to depress, whereas the smaller keytops will require a smaller force to depress.

One of the objects and advantages of this invention is to provide a computer keyboard that overcomes many of the problems that are identified above and to provide a less costly and more reliable adjustable force keystroke feature to enable users to more readily adjust the keystroke force to "customize" the keyboard to their preferences without dramatically changing the fundamental "tactile feel" characteristics of the keyboard.

BRIEF DESCRIPTION OF THE DRAWINGS

Preferred embodiments of the invention are described below with reference to the following accompanying drawings.

FIG. 3 is a fragmentary vertical cross-sectional view similar except showing the key in the "down" position actuating a membrane keyswitch;

FIG. 4 is a combination fragmentary vertical cross-sectional view taken along line 4—4 in FIG. 1 and a block diagram showing an air piston connected to an air chamber shown in block form; and FIG. 5 is an X-Y graph of the keystroke force vs. keystroke travel or displacement, illustrating three different curves, one representing a "soft" key touch, a second representing a "medium" key touch and a third representing a "hard" key touch that may be obtained depending upon the position of the slide illustrated in FIG. 4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
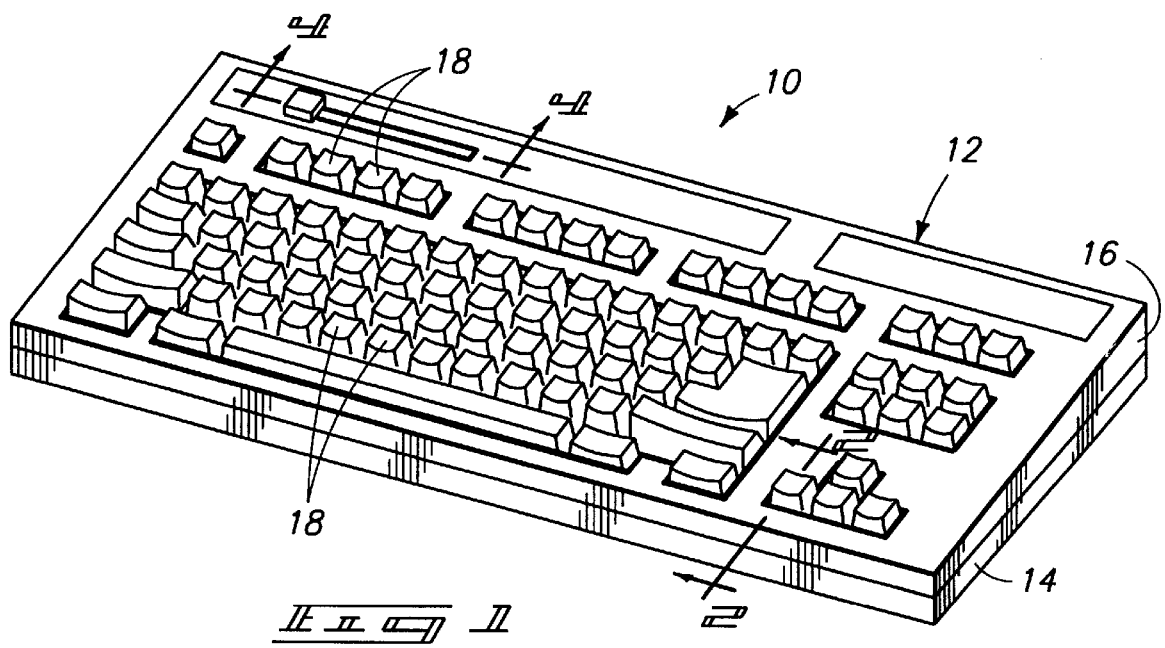
FIG. 1 is an isometric view of a full-travel computer keyboard containing the subject invention.

Referring in detail to the drawings, a preferred embodiment of the present computer keyboard is illustrated in FIG. 1. It is generally designated with the numeral 10. The keyboard 10 has a housing or case 12 with a lower housing portion 14 and an upper housing portion 16. The housing 12 receives an array of keys 18 at desired key positions that are manually selectively depressed by the user's fingers to input information and data to a computer or like device.

The keys 18 are supported by a common back or support plate 20 having apertures 22 at the key position. A membrane keyswitch assembly 24 is mounted on the support plate 20 with apertures 25 at the key positions. A monoblock 32 having individual keystem supports or bearings 34 is mounted overlying the membrane keyswitch assembly 24.

Each of the keys 18 has a keytop 26 with a keystem or plunger 28 movably supported by an associated keystem support 34. Preferably the key plunger 28 has an annular shoulder or foot 30 at its lower end.

The membrane assembly 24 has a membrane keyswitch 36 at each key position. Each of the keyswitches 36 has an upper flexible membrane layer 38 with a printed circuit switch contact thereon (not shown) and a lower flexible membrane layer 40 having a complementary printed circuit switch contact printed thereon (not shown). An intermediate dielectric spacer layer 42 is positioned between the upper and lower layers 38, 40.

The keyboard 10 has an elastomeric dome sheet 46 overlying the membrane switches 36 in which the dome sheet 46 has an individual dome return spring 48 that forms part of each key 18. Each elastomeric dome return spring 48 provides the tactile feel of the key and serves to bias the keytop 26 upward to its rest position when the manual depression force is removed. The present dome return spring 48 has an additional feature of a switch actuator 50 that engages and activates the keyswitch 36 when the keytop 26 is depressed.

Each elastomeric dome return spring 48 has a generally irregular frusto-conical annular wall that is collapsible when the keytop 26 is depressed. The collapsible wall provides a "break-over" tactile feel to the key touch as shown in the force-displacement curves of FIG. 5.

The lower portion 14 of the housing 12 has an air chamber 52 formed therein extending to the key positions beneath the support plate 20. The air chamber 52 has key compartments 54 directly below each keyswitch 36 and interconnecting compartments 56 that extend between and interconnect the key compartments 54. Ports 58 are formed in walls of the lower portion of the housing 12 interconnecting the compartments 54 and 56. The compartments 54 and 56 and ports 58 are of sufficient size to maintain the air pressure constant throughout the air chamber 52 and to prevent surging or wave action.

The air chamber is enclosed by an air-impervious membrane 60 preferably made of a moldable elastomeric material similar to the material used to form the elastomeric dome sheet 46. The air-impervious membrane 60 is mounted or clamped between the support plate 20 and lower portion 14 of the housing 12 using fasteners 62 such as screws. The air-impervious membrane 60 serves as a flexible upper wall of the air chamber 52.

Figure 2:
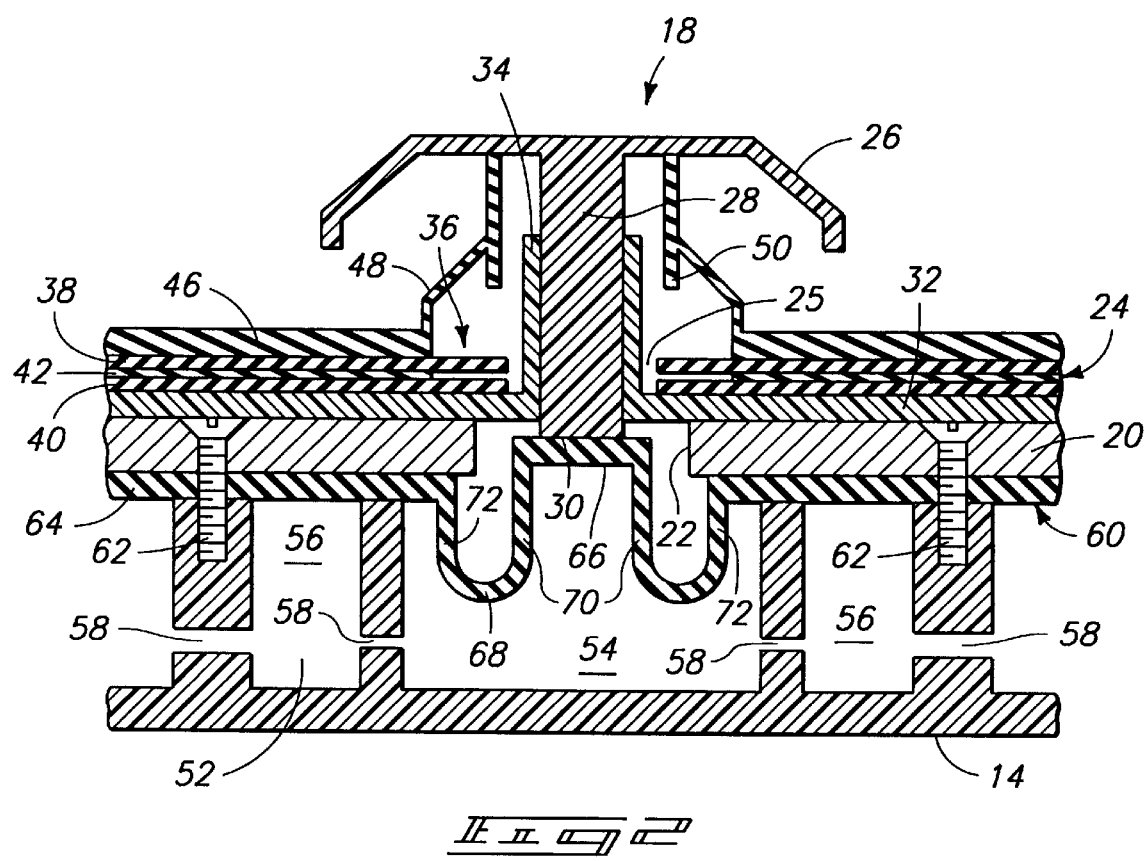
FIG. 2 is a fragmentary vertical cross-sectional view of a full travel key having an elastomeric dome actuator/return spring incorporating a preferred embodiment of the present invention, in which the key is shown in the "up" position.

The air-impervious membrane 60 is comprised of a main body portion 64, a pedestal portion 66 and a bellows portion 68. The air impervious membrane 60 has a pedestal portion 66 at each of key positions, in which the top of the each pedestal portion 66 extends upward from the main body portion 64 into the apertures 22 of the support plate 20 as shown in FIG. 2. The top of each of the pedestal portions 66 engages the bottom or foot 30 of a corresponding key plunger 28 exerting an upward force on the plunger 28 that is adjustable by adjusting the air pressure within the air chamber 52.

The bellows portions 68 flexibly interconnects the pedestal portions 66 with the main body portion 64 so that the upward force applied by the pedestal portions is linear with the air pressure within the air chamber 52. In this manner the "tactile feel" remains the same and the force-displacement curve as shown in FIG. 5 does not shift laterally. More precisely, the points of "break over" and switch actuation take place at substantially the same displacement location independently of the value of the air pressure thus providing the same "tactile feel".

It should be noted that the effective cross-section of the pedestal portion 66 remains substantially constant independently of the air pressure thereby providing a substantially linear relationship between the upward force exerted on the key plunger and the air pressure in the air chamber 52. Preferably the bellows portion 68 is U-shaped in vertical cross-section as illustrated in FIGS. 2 and 3 with two spaced parallel leg segments 70 and 72. Preferably when the key is in the "up" position as shown in FIG. 2, leg segment 70 is longer than leg segment 72. When the key is fully depressed in the "down" position as shown in FIG. 3, leg segment 70 is shorter than leg segment 72. It should be noted that the effective surface area of the pedestal portion 66 does not materially change throughout the stroke of the key 18.

The computer keyboard 10 has an adjustable air supply 74 for supplying pressurized air to the air chamber 52 to cause the pedestal portions 66 to bias the key plungers 28 upward. The air pressure and resulting upward force may be varied as desired by the user by adjusting the air supply 74. Preferably the air supply 74 includes an air cylinder 76 mounted within the housing 12. A piston 78 is movably mounted in the cylinder 76. The cylinder 76 has a vent 80 adjacent one end to vent the air in the cylinder to the atmosphere when the piston 78 is fully retracted to provide minimum upward force against the key plunger 28 by the pedestal portion 66. A tube 82 is connected between the other end of the cylinder 76 and the air chamber 52.

A push rod 84 is attached to the piston 78 to move the piston toward or away from the far end of the cylinder 76 to adjust the air pressure in the air chamber 52. A slide lever 86 is attached to the piston rod 84 and extends upward through a slot 88 in the upper portion 16 of the housing 12 as illustrated in FIGS. 1 and 4. A knob 90 is mounted on the upper end of slide lever 86 to enable the keyboard user to manually move the slide lever 86 to adjust the air pressure in the air chamber 52 to adjust the magnitude of the force required to depress a keytop 26.

FIG. 5 is provided to more clearly illustrate the effectiveness of the present invention. FIG. 5 is an X-Y graph showing the tactile force required to depress a keytop 26 vs. the displacement or stroke of the keytop 26. Three representative curves A, B and C are shown. Each curve has an initial displacement segment 92 representing the force and displacement of the keytop as it is being initially depressed. Curve segment 94 represents the "break over" phase in which the force required to further depress the keytop dramatically decreases thereby providing tactile feed-back to the user that the associated keyswitch is being actuated. The actual switch point is represented by the numeral 96. The over travel phase of the stroke is represented by curve segment 98.

Curve A presents the condition in which the slide lever is moved to the fully retracted position to vent the air pressure to the atmosphere and provide a minimum upward force by the pedestal portions 66; referred to as a "soft" feel. Curve B represents the condition in which the slide lever is moved to an intermediate position to provide an intermediate upward force by the pedestal portions; referred to as a "medium" feel. Curve C represents the condition in which the slide lever 86 is moved to the fully extended position to provide maximum upward force by the pedestal portions; referred to as a "hard" feel. It should be noted that even though the force required to depress a keytop is increased as the pressure in the air chamber is increased, the location of the "break over" and the switch point 96 relative to the stroke does not materially change. Thus the "tactile feel" of each key remains the same, independently of the magnitude of the air pressure in the air chamber 52.

In a preferred embodiment, the volume of the air chamber 52 and the cylinder 76 is approximately 16 cu. in. when the piston 78 is fully retracted and approximately 11 cu. in. when the piston 78 is fully extended. Thus the user is able to adjust the force required to depress a key from a "soft" touch of 30 grams to a "hard" touch of 70 grams. The same keyboard can be used by a child or by a very strong adult. Further the same user may desire to change the force required to activate the keyswitches depending upon the length of typing or the time of day to reduce fatigue.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A computer keyboard comprising:

a keyswitch support plate;

a plurality of manual independently depressible keys mounted overlying the keyswitch support plate at desired key positions, with each key having a keytop with a plunger that is mounted for downward and upward movement in a path through the support plate;

a keyswitch membrane assembly mounted on the keyswitch support plate having a membrane keyswitch associated with each key that is activated when an associated keytop is manually depressed;

each key having an elastomeric dome return spring above the keyswitch membrane assembly for resisting the depression of the keytop and for biasing the keytop upwards when the manual force is removed from the keytop;

a flexible air-impervious membrane extending between the key positions beneath the keyswitch support plate and in the path of the keytop plungers for deflection during the downward movement of the plungers; and an adjustable air pressure means associated with the flexible air-impervious membrane for applying an adjustable air pressure against the air-impervious membrane to enable a user to adjust the manual force required to deflect the air-impervious membrane and move the keys downward to actuate the keyswitches.

2. The computer keyboard as defined in claim 1 wherein the elastomeric dome return spring has a switch actuator for engaging the membrane switch when the keytop is depressed.

3. The computer keyboard as defined in claim 1 wherein the air-impervious membrane is made of an elastomeric material and has a pedestal portion at each key position for engaging an associated key plunger for applying a constant upward force against the plunger independently of the displacement of the plunger.

4. The computer keyboard as defined in claim 1 wherein the air-impervious membrane includes a main body portion, a pedestal portion at each key position and an interconnecting bellows portion at each key position interconnecting the pedestal portion with the main body portion.

5. The computer keyboard as defined in claim 4 wherein the interconnecting bellows portion enables the pedestal portion to move up and down without materially deflecting the main body portion.

6. The computer keyboard as defined in claim 4 wherein the interconnecting bellows portion enables the pedestal portion to move up and down without altering the effective cross-sectional area of the pedestal.

7. The computer keyboard as defined in claim 4 wherein the interconnecting bellows portion has a substantially U-shaped vertical cross-section.

8. The computer keyboard as defined in claim 4 wherein the interconnecting bellows portion enables the pedestal portion to move up and down without altering the upward force applied by the pedestal portion to the key plunger.

9. The computer keyboard as defined in claim 1 wherein the air pressure means includes an air chamber beneath the keyswitch support plate extending between the key positions in communication with the air-impervious membrane and an air supply means operatively connected to the air chamber for varying the air pressure within the air chamber to vary the force required to depress the keys.

10. The computer keyboard as defined in claim 9 wherein the computer keyboard includes a rigid housing beneath the support plate and wherein the air chamber is formed in the housing beneath the support plate and wherein the air-impervious membrane is mounted overlying and enclosing the air chamber.

11. The computer keyboard as defined in claim 9 wherein the air supply means includes an air cylinder that is operatively connected to the air chamber and an air piston movably mounted in the air cylinder to adjust the air pressure within the cylinder and air chamber and where the air supply means has a manually activated mechanism operatively connected to the air piston and adjacent the keys for enabling a user to manipulate the manually activated mechanism and adjust the air pressure within the air chamber.

12. The computer keyboard as defined in claim 9 and further comprising a keyboard housing and wherein the air supply means includes an air cylinder that is operatively connected to the air chamber and an air piston movably mounted in the air cylinder to adjust the air pressure within the cylinder and air chamber and where the air supply means has a manually activated slide mechanism mounted in the housing and operatively connected to the air piston and adjacent the keys for enabling a user to manipulate the manually activated slide mechanism to adjust the air pressure within the air chamber.

* * * * *